(12) United States Patent
Riddell

(10) Patent No.: US 6,718,701 B2
(45) Date of Patent: Apr. 13, 2004

(54) BIRD DETERRENT DEVICE

(75) Inventor: Cameron A. Riddell, Manhattan Beach, CA (US)

(73) Assignee: Bird Barrier America, Inc., Carson, CA (US)

( * ) Notice: Subject to any disclaimer, the term of this patent is extended or adjusted under 35 U.S.C. 154(b) by 0 days.

(21) Appl. No.: 10/171,577

(22) Filed: May 7, 2002

(65) Prior Publication Data

US 2003/0208967 A1 Nov. 13, 2003

(51) Int. Cl.[7] .................. A01M 29/00; E04B 1/92
(52) U.S. Cl. .................. 52/101; 119/537; 43/1
(58) Field of Search .............. 52/101, 60, 98; 119/537, 713, 963; 43/1; 248/909

(56) References Cited

U.S. PATENT DOCUMENTS

| | | |
|---|---|---|
| 2,306,080 A | 1/1942 | Peles |
| 2,456,731 A | 12/1948 | Peles |
| 2,475,047 A | 7/1949 | Peles |
| 3,282,000 A | 11/1966 | Shaw et al. ............ 52/101 |
| 3,407,550 A * | 10/1968 | Shaw ...................... 52/101 |
| 4,283,034 A * | 8/1981 | Sheehan ............... 248/263 |
| 5,253,444 A * | 10/1993 | Donoho et al. ......... 52/101 |
| 5,400,552 A | 3/1995 | Negre ..................... 52/101 |
| 6,006,698 A | 12/1999 | Negre ................... 119/537 |
| 6,250,023 B1 * | 6/2001 | Donoho ................. 52/101 |
| 6,457,283 B1 * | 10/2002 | Jensen .................... 52/101 |
| 2001/0017012 A1 * | 8/2001 | Wiesener et al. ....... 52/101 |

FOREIGN PATENT DOCUMENTS

| | | |
|---|---|---|
| EP | 300936 A * | 1/1989 |
| EP | 0 792 099 B1 | 11/1999 |
| FR | 2693080 A1 * | 1/1994 |
| GB | 2344269 A * | 6/2000 |

* cited by examiner

Primary Examiner—Anita King
(74) Attorney, Agent, or Firm—Jones Day

(57) ABSTRACT

A bird deterrent device comprising a base having spike elements extending thereabove, the base comprising alternating segments of differing widths having a scored or reduced thickness portion therebetween, and an elevated portion through which the spike elements are inserted into a channel formed in the bottom side of the base, the channel further having detents designed and constructed to hold the spike elements in place upon insertion.

13 Claims, 3 Drawing Sheets

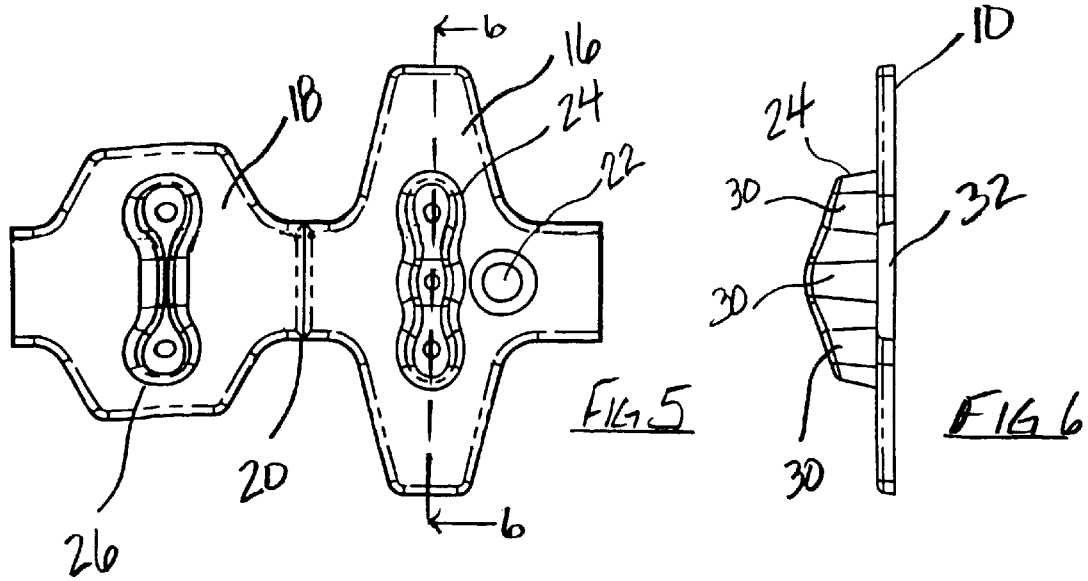
FIG 5
FIG 6
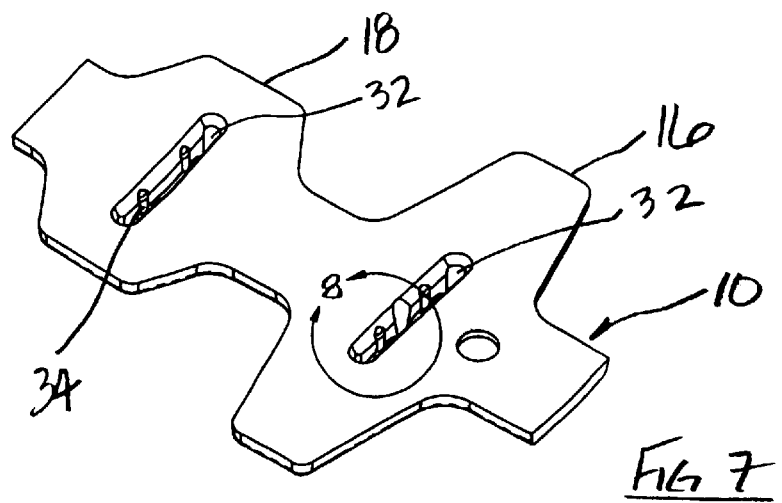
FIG 7
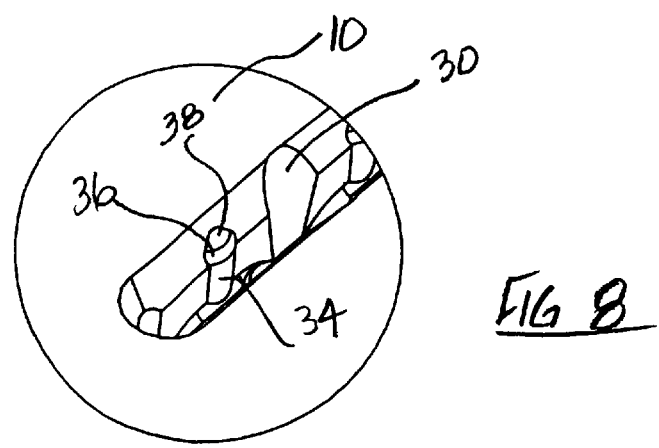
FIG 8

BIRD DETERRENT DEVICE

BACKGROUND OF THE INVENTION

1. Field of the Invention

The invention hereinafter described and claimed relates generally to bird deterrent devices, and specifically to the type of bird deterrent devices comprising a base for attachment to the perch location, and a series of spike elements protruding above the base.

2. Background

The desire to prevent birds from perching and roosting in areas inconvenient to humans probably dates back to the Dark Ages or before. The earliest bird deterrent devices were probably rocks hurled at the perched birds. In the last century, however, more modern and sophisticated devices have been developed, and have included everything from lifelike replicas of owls, snakes and other predators for the perching prey birds, to actual predators, to devices that repetitively issue a loud gunshot-like noise, among countless others.

Other type devices have been location-specific, and comprise those implements that are attached directly to the perch location and are intended to repel the birds from alighting. Amongst these devices, it has long been known to use devices comprising a base to be attached to the perch location, and a series of metal spikes extending above the base at different angles. One of the earlier U.S. patents granted for such a device was to J. S. Peles for an invention entitled "Bird Proofing," issued as U.S. Pat. No. 2,475,047 on Jul. 5, 1949. Since then, innumerable modifications on the basic design have been developed and patented.

This base-and-spike design has stood the test of time, and is still widely used today. The more recently patented improvements have not varied the basic design so much as they have been directed to improvements in the means by which the spikes are attached to the base element. For example, in U.S. Pat. No. 5,400,552, a device is disclosed in which one end of the spikes (having a generally round cross section) has a protuberance formed by flattening the spike material, with the resultant protuberance being slightly larger than the cross section of the canal in the base to which it is inserted. Inserting the protuberance into the canal causes some deformation of the base material which provides the attachment means.

In another patent directed to this same basic base-and-spike design, European Patent No. 0,792,099, each of the spike elements is made of a resilient material, and are the two ends of a rod that is preformed into a U-shape having a pre-determined angle between the two ends. In order to insert the two ends through their respective canals in the base, the ends must be pulled together. Once fully inserted, the ends are released, and seek to return to their pre-formed angle of separation, but are prevented from doing so by the construction of the canals in the base. The spike ends are thus held within the base by the force exerted by the spike elements against the edge of the canals.

As will be noted, the '099 patent only discloses the use of U-shaped, double spike elements. A particular attachment problem arises with the use of a single spike element. As shown in European Patent No. 0,792,099, when only double spike elements are employed, the resiliency of the spike material itself can be used as the attachment means. However, using all double spike elements may not be the most optimum design for various reasons. If a single spike element is employed in the design, then the resiliency of the spike material cannot be utilized in the manner disclosed in the '099 patent, and some other attachment means must be used, such as the protuberance shown in the '522 patent discussed above. That, however, adds to construction and assembly costs, and may loosen over time, particularly if there is not close tolerances on the canal and the protuberances.

As these and other patents directed to the basic base-and-spike design show, the illusive design goals are to have an overall device that is stable and cannot be easily dislodged, to have a means for attaching the spike elements to the base in which the spike elements are also stable, and allow single L-shaped spike elements to used, and lastly, to do so in a way in which the component and construction costs are as low as possible. An additional design goal is ease and universality of attachment, as the perch locations come in all places, shapes and sizes.

It is, therefore, an object of this invention to provide such a device which accomplishes those illusive design goals.

SUMMARY OF THE INVENTION

The bird deterrent device herein disclosed and claimed comprises a base-and-spike type device that provides sufficient stability for the device with the minimum amount of component material by utilizing a base design characterized by alternating portions of extended wing segments and narrow neck portions of the base, in which the thickness of the base along its entirety is thin, and only that portion from which the metal spikes actually protrude is elevated so as to provide stability to the base-spike attachment, and channels formed in the underside of the base into which the spike elements are inserted, which channels have detents that are designed and constructed to hold either the double or single spike element snugly in place within the channel.

In addition, between each of the wing and neck segments, the base is scored. The overall thinness of the base portion and the intermediate scoring allows the device to be significantly bent, without breaking, so as to be useful with radically curved perch surfaces, and to be easily and cleanly broken by hand at the segment lines, thereby allowing the installer to easily fit the device to the exact length of the perch location.

BRIEF DESCRIPTION OF THE DRAWINGS

FIG. 5 is a top view of two segments of the base of the preferred embodiment of this invention.

FIG. 6 is a side view taken along line 6—6 in FIG. 5.

FIG. 7 is a perspective view of the underside of the base section shown in FIG. 5.

FIG. 8 is an isolated view taken from circle 8 in FIG. 7.

DETAILED DESCRIPTION OF THE PREFERRED EMBODIMENTS

Figure 1:
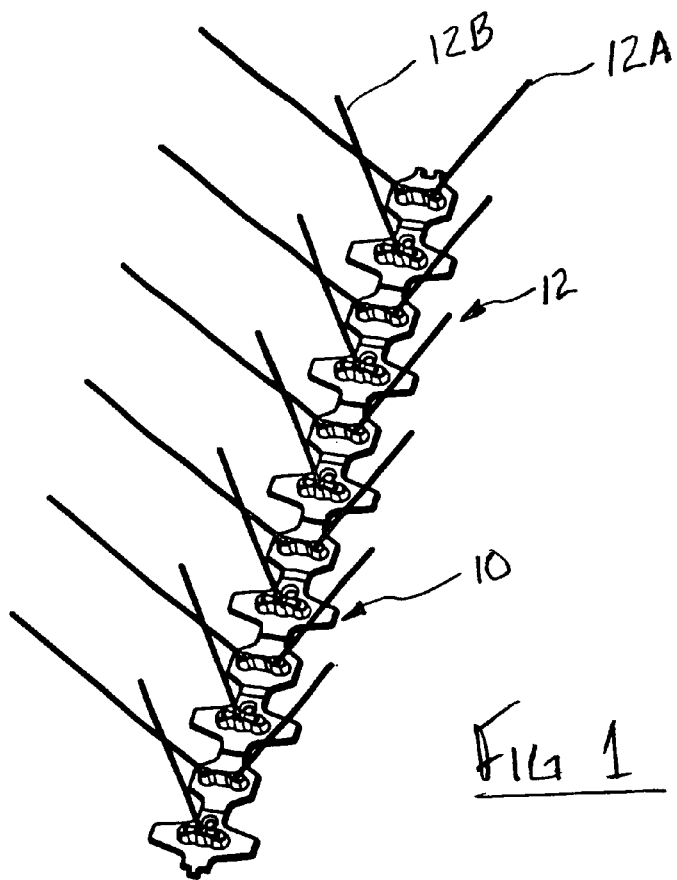
FIG. 1 is a perspective view of the fully-assembled bird deterrent device of this invention.

Referring to FIG. 1, the overall bird deterrent device of this invention comprises generally a base 10 from which a series of spike elements 12 protrude in a generally upward direction relative to the base 10. The spike arrangement shown in FIG. 1 alternates between a double spike elements 12A that extends upwardly and outwardly from the base 10, and single spike elements 12B that extend directly and perpendicularly above the base 10. The spike elements 12A are in a substantially U-shape in which there are two elongate portions that extend upwardly from a smaller intermediate bent portion. The spike elements 12B are in a substantially L-shape in which a single elongate portion extends upwardly from a smaller bent portion.

Figure 2:
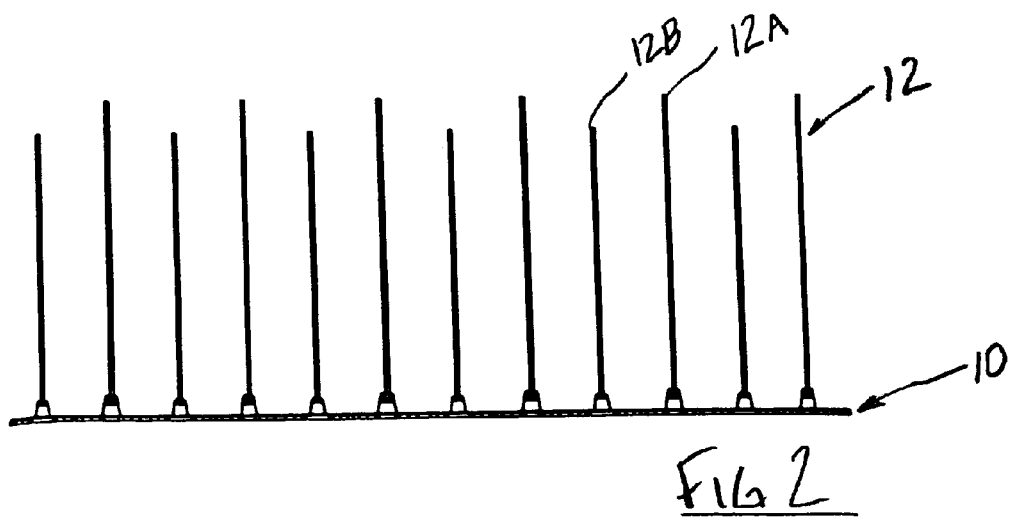
FIG. 2 is a side view of the device shown in FIG. 1.
Figure 3:
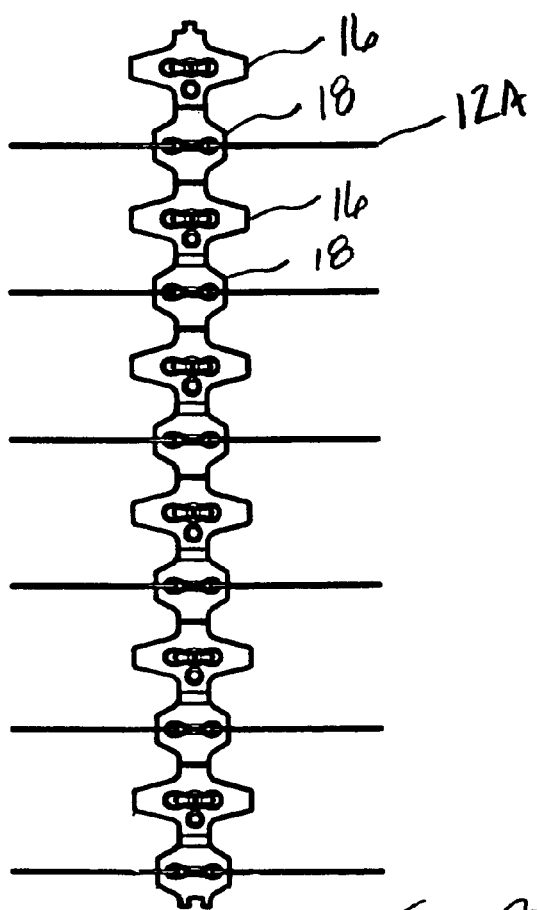
FIG. 3 is a top view of the device shown in FIG. 1.

As shown in FIGS. 2 and 3, when viewed from the side and from the top, respectively, all of the spike element 12 are preferably in parallel arrangement so as to provide the maximum coverage with the minimum number of spike elements. It will be appreciated, however, that any number of different spike arrangements can be used.

Figure 4:
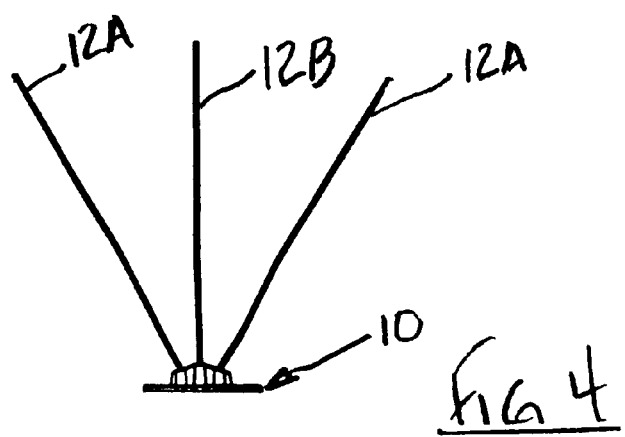
FIG. 4 is an end view of the device shown in FIG. 1.

As shown in FIG. 4, when viewed from the end, the spike arrangement resembles a "W" arrangement, similarly intended to provide the maximum coverage. In the preferred embodiment, a total span width of approximately 5 to 8 inches is utilized. Many such different spike arrangements are possible and this invention is not restricted to the particular spike arrangement shown.

As seen in FIGS. 1, 3 and 5, particularly FIGS. 3 and 5, the base 10 comprises a series of adjacent wing segments 16 and neck segments 18. In the preferred embodiment, these adjacent segments are of unitary construction, but at their junction 20 are scored, or otherwise have a reduced thickness. The purpose of this is to allow adjacent segments to be easily and cleanly broken by hand to aid in installation, and to provide for increased flexibility of the base without breaking.

As will also be noted in FIGS. 3 and 5, the wing segment 16 has substantially extended width relative to the neck segment 18 (in the preferred embodiment, the segments 16 are 1.60 inches wide, and the segments 18 are 1.00 inches wide), and thus provide lateral stability to the bird deterrent device when it is installed on a perch location.

In this embodiment, each of the wing segments 16 also has an attachment hole 22 that extends entirely through the base 10. The attachment hole is used to affix the base 10 to the perch location, which can be by any conventional means such as nails, screws, adhesive tape or glue.

As shown in FIG. 5, the upper outside edges of the base are rounded. As also seen in this Figure, each of the base segments 16 and 18 have elevated portions 24 and 26, respectively. As seen in cross-section in FIG. 6, it will be noted that the base 10 is quite thin (in the preferred embodiment, 0.080 inches), whereas the elevated portions extend an appreciable distance thereabove (in the preferred embodiment, 0.244 inches). The elevated portions 24 and 26 can be designed and constructed to accommodate anywhere from one to several spike elements. In the preferred embodiment shown herein, however, the elevated portion 24 is designed and constructed to accommodate up to three spike elements, whereas elevated portion 26 can accommodate two spike elements.

The entirety of the base 10, including the elevated portions 24 and 26, can be made out of any appropriate material that exhibits acceptable characteristics of strength, durability, flexibility and low cost. In the preferred embodiment, however, a polycarbonate material is used. It will thus be appreciated that by keeping the base 10 thin, and using a plastic material that has some flexibility while not sacrificing strength, the bird deterrent device of this invention can be used not only on flat surfaces, but also surfaces that are radically curved. The scoring or reduced portion 20 assists in this regard, as well.

As seen in FIG. 6, the elevated portion 24 has three spike tunnels 30 extending completely therethrough. As will be noted, the diameter of the tunnels 30 is larger at the base 10 than at the top of the elevated portions to facilitate insertion of the spike elements therethrough.

As best seen in FIG. 7, which depicts the underside of the base 10, channels 32 are formed in the base 10. Each of the spike tunnels 30 communicates with a channel 32.

As seen in FIG. 8, within each channel 32 are multiple pairs of opposing semicircular detents 34 that extend inwardly from the inside surface of the channels 32. The end of each detent 34 adjacent to the bottom side of the base 10 has a slightly enlarged neck portion 36 terminating in a reduced diameter portion 38. The purpose of detents 34 is to securely hold the bent portions of the spike elements 12A and 12B in place after insertion, regardless of whether the spike element 12 is U-shaped or L-shaped. For example, referring back to FIG. 1, it is seen that in the preferred embodiment spike elements 12A are double spike elements created by forming the spike rod into a U-shape before insertion. During construction of the bird deterrent device, the distal ends of the legs or elongate portion of the spike elements 12A are inserted into the two spike tunnels of segment 18 of base 10, and inserted fully until the center bent portion of the spike element 12A is pulled or pushed into the spike channel 32 past the neck portion 36 on detents 34. As will be appreciated, the channel 32 is of sufficient depth so that the center bent portion of the spike element 12A resides entirely within the channel 32, thus preserving a perfectly flat bottom surface to the base 10 for attachment to the perch location. Once the spike element 12A is properly seated within channel 32, the distal ends can then be manually pulled apart to the degree desired. The spike elements 12A and 12B can be constructed of any material having suitable characteristics of strength, flexibility and resiliency, but are preferably made of 302 or 316 stainless steel, and preferably have a circular cross-section with diameter of 0.046 inches. The channels 32 have a similar width, and the space between the adjacent detents 34 is preferably 0.032 inches.

The spike elements 12B comprise a single elongate portion and a smaller bent portion at one end thereof, and utilizing the attachment means of channel 32 and detents 34, can be held in place just as snugly as the U-shaped spike elements 12A. A leg or elongate portion of the spike element 12B is preferably inserted through the center spike tunnel 30, as shown in FIG. 6, until the bent portion of the L-shaped spike element is brought flush within spike channel 32, and is held in place by detents 34.

As will be appreciated, the combination of the thin base 10 and the elevated portions 24 and 26 provide sufficient support for the spike elements 12, and the elongated wing portions on base segments 16 provide for lateral stability to the device while minimizing the amount of raw material that must be used in the construction of the base 10, and allowing the base 10 to attain sufficient flexibility so that it can be used on non-flat surfaces, and the scoring between the adjacent segments provides numerous easy and clean breakpoints. The use of the detents 34 instead of other attachment means previously utilized provides for ease of construction, a secure final product, and works with both the U-shaped double spike element and the L-shaped single spike element. Thus, the invention herein disclosed provides many advantages over the prior art devices.

The invention herein disclosed and the protection provided therefor by this patent is not limited to the preferred embodiment set forth and described above, but is of the full breadth and scope of the following claims.

What is claimed is:

1. A device for deterring birds from alighting on a location comprising:

a base;

a plurality of spike elements attached to said base;

said base having a bottom side that is attachable to the location and an upper side from which said spike elements protrude;

said spike elements having at least one elongate portion and a smaller bent portion;

said base having a series of channels formed in its bottom side that are sufficiently large to accept said bent portions of said spike elements;

said base having a plurality of spike tunnels that registers with said channels, said elongate portion of each said spike elements extending through one of said spike tunnels; and at least one detent in said channels designed and constructed to hold said bent portion of said spike elements snugly within said channels.

2. The device of claim 1, in which said spike elements have a substantially L-shape.

3. The device in claim 1 in which said spike elements have a substantially U-shape.

4. The device in claim 1 in which at least one said spike element has a substantially L-shape and at least one said spike element has a substantially U-shape.

5. The device of claim 1 which there are a plurality of said detents.

6. The device of claim 5 in which said plurality of detents are placed on opposite sides of said channel.

7. The device of claim 6 in which said detents are placed immediately across from one another in said channel.

8. The device of claim 5 in which each of said detents has a semicircular shape.

9. The device of claim 8 in which said detents have a neck portion whose diameter is greater than that of the remainder of said detent.

10. The device in claim 1 in which said detent has a semicircular shape.

11. The device of claim 10 in which said detent has a neck portion that has a greater diameter than that of the remainder of said detent.

12. The device of claim 1 in which said spike elements are constructed of metal.

13. The device of claim 1 in which said spike elements have a substantially circular cross-section.

* * * * *